United States Patent Office 2,873,192
Patented Feb. 10, 1959

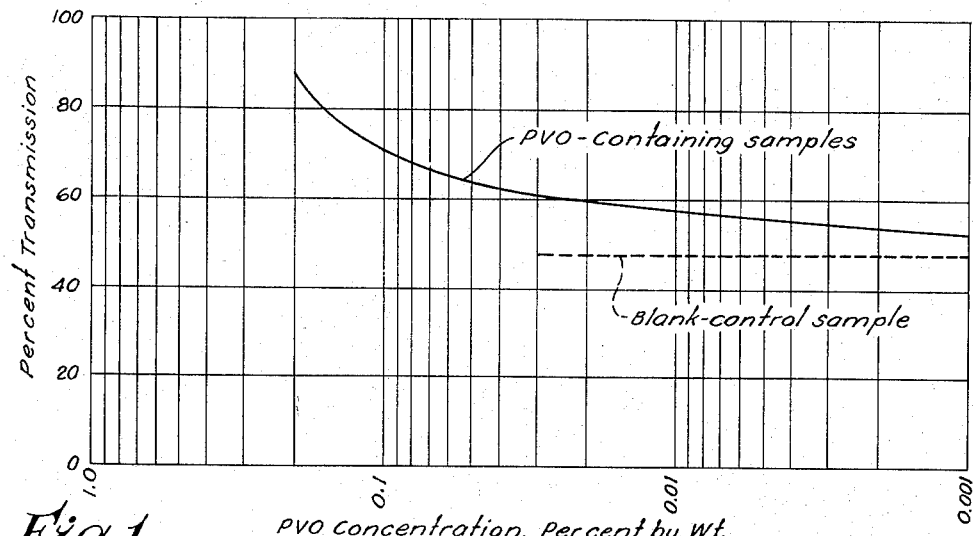
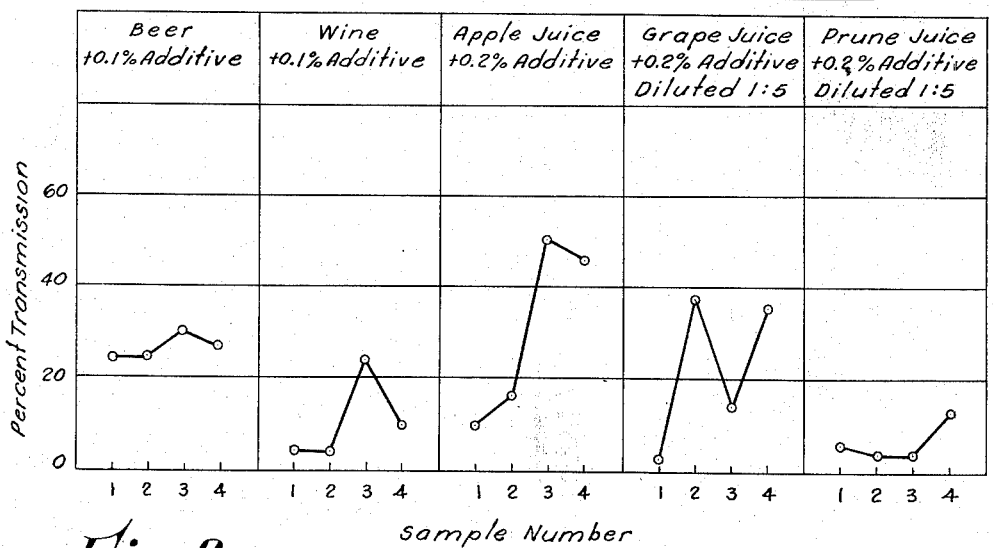

2,873,192

CLARIFICATION OF BEVERAGES

Wilhelm E. Walles and William F. Tousignant, Midland, Mich., assignors to The Dow Chemical Company, Midland, Mich., a corporation of Delaware Application December 9, 1957, Serial No. 701,377

15 Claims. (Cl. 99—28)

The present invention relates to the treatment of various essentially clear or limpid beverages to materially improve their clarity and transparency or translucence and to render them stable against development of haze subsequent to treatment.

Many essentially clear liquid beverages, or beverages intended to be of an essentially clear or limpid character, are liable to be obtained in their as-manufactured state with some degree of haziness or cloudiness that persists despite filtration, or to develop such a condition upon standing or being chilled, or both. It is quite common, of course, for beverages to be stored, sometimes under refrigeration, after their manufacture. Besides, they are frequently chilled prior to consumption to enhance their palatableness. Such haziness, including "hazing on standing" and "chill haze," occurs frequently in the several essentially clear or limpid beverages, both non-alcoholic and alcoholic in nature, that are derived from various grains, fruits, berries and vegetables or mixtures thereof. Of course, most of the alcoholic beverages are prepared by fermentation processes and are often obtained as distilled or spirit fortified products. In addition, many beverages are often carbonated, either by natural or artificial means, and may often be artificially sweetened with sugar or other saccharine materials.

Hazing in essentially clear beverages is generally believed to be primarily caused by pectins and tannins and the like (whose solubilities may range from being completely insoluble to completely soluble substances and which may be colloidal or otherwise efficiently dispersible materials), as well as by other dark colored soluble or partially soluble materials, that are obtained in the beverage during its manufacture. In some instances, proteinous constituents may also be responsible for the hazing phenomena in beverages. It has been proposed, for example, that a protein tanning complex in beer, which frequently contains traces of such heavy metals as copper and iron, is responsible for clouding, particularly chill hazing, of the beverage. Such complexes are also felt to be responsible for off-flavors in the beer because of their propensity to induce oxidation of some constituents of the beverage or due to organic reduced sulphur in the complex, or both. Insoluble constituents, including a large part or all of the completely insoluble pectins and tannins, can ordinarily be removed quite readily from a beverage by ordinary filtration procedures. Such physical treatment, however, does not accomplish removal of the soluble or efficiently dispersed pectins, tannins and other dark colored substances (which frequently are of high molecular weight and which may be relatively unstable in nature), including those in protein complexes, that engender the above-mentioned turbidity and hazing phenomena. Furthermore, the efficiently dispersible pectins, tannins and protein complexes may often be responsible for many difficulties in the filtration of the beverages.

It would be advantageous, and it is the chief aim and concern of the present invention, to provide new and highly efficacious agents for the treatment of essentially clear beverages that would be capable of coagulating and precipitating therefrom the water soluble or otherwise efficiently dispersible colloidal pectins, tannins and other dark colored soluble and partially soluble or otherwise dispersible substances that are responsible for producing the hazing phenomena in the beverage. It would be a corollary advantage of commensurate magnitude, and it is the principal object of the present invention, to provide a process for the material clarification and stabilization against hazing of essentially clear beverages using the referred-to novel coagulating and precipitating agents. It would be additionally advantageous, and it is also an objective of the invention, to provide a coagulating and precipitating agent of the described type and a process for its utilization in the clarification of beverages that would possibilitate, along with the achievement of the primary end, many ancillary and cognate benefits and desiderations, as hereinafter more fully delineated.

It is to be fully understood, incidentally, that the operability and utility of the present invention is neither dependent upon nor to be evaluated in the light of an exact identification or characterization of the substances that cause hazing in beverages. The reference to them as including pectins, tannins and proteinous complexes is merely set forth upon the basis of reasonable information and belief. And, as is hereinafter demonstrated, such substances, regardless of their specific nature, are efficaciously coagulated and precipitated from beverages of the indicated type by use of the herein contemplated treating agents.

In accordance with the practice of the present invention whereby the above mentioned and hereinafter more specifically manifest objects, advantages and benefits may be achieved, essentially clear or limpid beverages may be advantageously treated for removal of pectins, tannins, protein complexes and dark colored soluble materials of naturally occurring origin in order to be clarified and rendered stable against hazing by a process which comprises adding to the beverage being treated a minor proportion of, say, between about 0.0001 and 1.0 percent by weight, more advantageously from about 0.01 to about 0.1 or 0.2 percent, based on the weight of the beverage of a coagulating and precipitating agent for the haze and turbidity-inducing ingredients in the beverage that consists of an N-vinyl-2-oxazolidinone polymer of the general structure:

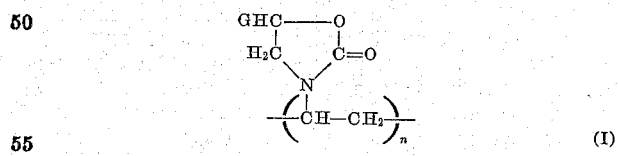

(I)

or water soluble isomers and homologues thereof, wherein G is hydrogen or methyl and $n$ is a plural integer of considerable magnitude, such as one that is in excess of 50 and usually in excess of 100 or so. Of course, the above-indicated limits are not absolute since, in certain cases, greater or lesser quantities of the agent may be suitable and effective to employ. Thus, any quantity of the agent that is an amount which is adequate to materially precipitate the haze-inducing ingredients from a given beverage may be utilized in the practice of the invention. The treatment may be advantageously and efficiently accomplished at any moderate temperature. Thus, it is generally most advantageous and expedient to conduct the treatment at normal room temperatures. However, suitable results can be obtained when the beverage is treated at any temperature between its freezing point and the highest temperature tolerable by and not deleterious to the beverage. About 40° C. is usually a suitable upper limit of temperature for the performance of the process.

The treatment can be performed by directly adding the water soluble N-vinyl-2-oxazolidinone polymer to the beverage and permitting the desired coagulation and precipitation of the pectins, tannins, complexes and other dark colored soluble ingredients to occur, followed by removal of the precipitate and recovery of the clarified beverage. The polymeric coagulating and precipitating agent may, of course, be added in the form of an aqueous solution or dispersion, preferably as a relatively concentrated composition in the liquid vehicle, to the beverage being treated. The beverage may be treated at any desired or convenient stage of its manufacture or processing. With beer, for example, the treatment may be made when the beverage is being racked down from the fermenters or when the beer is commencing its storage in the cold cellars. The agent can even be added to the beer while it is in the mashing stage of its manufacture. In such instances, however, relatively greater quantities of the agent may be required for optimum results.

If desired, the beverage may be agitated or stirred during addition of the polymeric agent or shortly thereafter, or both, in order to ensure a quick and thorough admixture of the coagulating and precipitating agent with the beverage being treated. While this is not an absolute necessity, it may be resorted to for purpose of expediting the processing of large volumes of the beverage, especially when the treatment is made with batch quantities. As is apparent, the agent may also be continuously added to a flowing stream of the beverage being treated, in which case the turbulence of the moving liquid usually produces an intimate incorporation of the agent therein. Ordinarily, the water soluble N-vinyl-2-oxazolidinone polymer effects coagulation and precipitation in the beverage of the normally non-filterable pectins, tannins, complexes and other haze-inducing ingredients in a practically instantaneous manner, seldom requiring more than an hour for the purpose. Generally, only several minutes— usually less than ten—are all that are necessary for such result. The precipitate that forms generally settles quite rapidly from the beverage and is usually quite flocculent in nature. Most often, the precipitate is found to consist of relatively large size particles.

After the coagulation and precipitation of the haze-inducing ingredients has been accomplished, the precipitate may be isolated or removed and the clarified beverage recovered by settling and decantation or siphoning operations or by filtration of the treated beverage. If preferred, filtration may be facilitated by utilization, in the conventional manner, of such filter aids as diatomaceous earth, cellulosic filter aids and the like or their equivalent. Because the treatment of the present invention produces good precipitation of haze-inducing ingredients from substantially all essentially clear beverages to yield a generally relatively clear supernatent, rapid filtration or other liquid separation is greatly facilitated with minimized problems of apparatus maintenance, such as filter cleaning.

The water soluble N-vinyl-2-oxazolidinone polymer coagulating and precipitating agents used in the practice of the present invention have a pronounced ability to clarify the beverages being treated and to stabilize them in a substantially permanent manner against hazing, even upon being chilled for prolonged periods of time. Frequently, the beverage is made remarkably pellucid and transparent by treatment with the N-vinyl-2-oxazolidinone polymer. In addition, the taste of many beverages oftentimes appears to actually be improved and appreciably augmented by the treatment. Besides, many spumous or foamy beverages, such as beer and the like, are additionally ameliorated by the present treatment, especially when it is accomplished with poly-N-vinyl-5-methyl-2-oxazolidinone, in having their head of foam (as produced upon pouring) improved in its general physical characteristics including thickness, appearance and life. Besides, the foam forming ability of a treated spumous beverage, such as beer, is usually also enhanced by practice of the present invention.

As indicated, either poly-N-vinyl-2-oxazolidinone (PVO—wherein G, in Formula I, is hydrogen) or poly-N-vinyl-5-methyl-2-oxazolidinone (PVO-M—wherein G, in Formula I, is methyl) or their close, water-soluble isomers and homologues that are equivalent for the present purpose may be utilized as the coagulating and precipitating agents in order to accomplish the treatment of the present invention. None of the N-vinyl-2-oxazolidinone polymers that may be employed produce deleterious influences or intolerable toxicological effects or other undesirable occurrences in the beverage being treated. Advantageously, the normally solid polymer that is utilized as a coagulating and precipitating agent for the present purposes is a high polymer having a Fikentscher K-value of at least about 5. More advantageously, the N-vinyl-2-oxazolidinone polymer employed has a Fikentscher K-value between about 10 and 100. Most advantageously, its K-value is from about 10 or 15 to 75. The Fikentscher K-value of a polymeric substance is a quantity, as has been defined by Fikentscher in Cellulosechemie, 13, 60 (1932), that represents an approximate measure of the weight fraction of a given sample of polymer in an infinitesimal molecular weight range. According to a concept that is widely acceptable to those skilled in the art, it may be said to be in correlation, in an exponential manner, to the mean average molecular weight that obtains in a given sample of a polymer substance.

The Fikentscher K-value of a water-soluble polymer may be determined according to the equation:

$$\text{Log } Z = \frac{0.000075 K^2}{1 + 0.0015 K} + 0.001 K \quad (1)$$

wherein K is the Fikentscher K-value and Z is the relative viscosity at any chosen temperature which is obtained as the quotient of the viscosity of the polymer solution at a given concentration "c" (which, advantageously, is constant at 1 percent by weight of dissolved polymer in the solvent) divided by the viscosity of the solvent. Equation 1 is derived from the following equation wherein $1000k = K$:

$$\text{Log } Z = \left( \frac{75k^2}{1 + 1.5kc} + k \right) c \quad (2)$$

wherein c, as indicated, is the concentration of the polymer in solution expressed in grams per 100 ml. Equation 2 is derived from Fikentscher's original equation:

$$\text{Log } Z = \left( \frac{ak^2}{1 + 1bkc} + k \right) c \quad (3)$$

where a and b are constants which have numerical values of 75 and 1.5, respectively, regardless of the polymer used or of concentration or of other factors involved. As a practical matter, the Fikentscher K-value is oftentimes determined by solution for K of Equation 1.

The N-vinyl-2-oxazolidinone polymers that are utilized in the practice of the present invention, including PVO and PVO-M (as well as other close, water soluble homologues and isomers) are moderately hygroscopic polymeric materials. PVO-M is readily soluble in water, in any concentration. PVO, especially as a polymer of molecular weight greater than about 10,000, is generally soluble in water in solutions that contain more than about 20 percent by weight of the polymer. In more dilute, plain water solutions the PVO polymer is not generally soluble, although it readily dissolves in weak aqueous saline solutions, such as solutions of a few percent or less of sodium chloride. Both PVO and PVO-M as well as their adjacent, close homologues are normally solid resinous substances that are generally obtainable as white powders which are free from objectionable taste or perceptible odor.

As has been indicated, any essentially clear or limpid beverage, or one intended to be of such character, may be benefited by treatment in accordance with the present invention. Typical of such beverages there may be mentioned beer, ale, porter, the various grape and other fruit or berry wines, champagne, sake, brandy, whisky, gin, vodka, cider (sweet or hard), such unfermented fruit juices as apple juice, grape juice, prune juice and the like, cranberry juice and other clear berry juices, sweet or so-called "soft" drinks (both carbonated and non-carbonated, either before or after carbonation) and other similar beverages that are desired to be obtained and used in a transparent or translucent, free or substantially free from haze condition.

To illustrate specific treatments that may be accomplished in the practice of the invention, apple juice may be advantageously clarified and stabilized against hazing with between about 0.001 and 0.2 percent by weight, based on the weight of the juice, of the N-vinyl-2-oxazolidinone polymer agent. Preferably at least about 0.003 percent of the agent is used for clarifying apple juice. Beer and wine are effectively enhanced with from 0.001 to 0.1 percent or so of the agent, preferably about 0.005 or so percent. For treatment of beer, this is in the range of from one-quarter to twenty-five pounds of the treating agent per hundred barrels (twenty-five thousand pounds) of beer. Frequently it is more desirable and economical to use from one-half to two pounds, more advantageously about one pound, of the agent per hundred barrels of beer. In the case of most wines and other tannic acid-containing beverages, an optimum quantity of the agent to use is frequently an amount that is about equal on a weight basis to the amount of tannic acid in the beverage. As will be readily appreciated, however, specific requirements may oftentimes be found to vary with particular beers, wines or other beverages being treated. Prune and grape juice are beneficially treated about the same way as apple juice.

In order to further illustrate the invention, the following examples, not intended to be limiting or restrictive, are given wherein all parts and percentages are to be taken on a weight basis.

*Example "A"*

A sample of commercially obtained, canned apple juice (packaged unfermented while fresh) was opened at room temperature. On cooling overnight in a refrigerator at about 4° C., the apple juice developed a strong haze which almost disappeared after the juice had been returned to normal room temperature (ca. 25° C.). Another sample of the same juice was then divided into four separate portions having individual volumes of about one hundred milliliters and designated samples "A-1," "A-2," "A-3" and "A-4," respectively. Sample "A-1" was left unaltered to serve as a blank for purposes of control. To sample "A-2" there was added about 0.2 percent of poly-N-vinyl-2-pyrrolidone (PVP—which may also be termed poly-N-vinyl-2 - pyrrolidinone) having a Fikentscher K-value of about 30. The PVP-treated sample "A-2" was prepared for purposes of additional comparison and contrast, since PVP has been recommended and is known as a beverage clarifying agent, as, for example, in United States Letters Patent No. 2,688,550. To samples "A-3" and "A-4" there were respectively added about 0.2 percent each of PVO (K-17.5) and PVO-M (K-17.3). Upon addition of the agents, samples "A-3" and "A-4" gave a precipitate within one minute. Sample "A-2," in contrast, became more hazy. On standing overnight in a refrigerator at about 4° C., samples "A-1" and "A-2" were found to have become quite hazy. Samples "A-3" and "A-4," however, were quite clear and were each observed to have formed a precipitate that had settled out of the juice. In addition, both samples "A-3" and "A-4," after overnight chilling, had a much lighter color than either samples "A-1" or "A-2." This indicated that the PVO and PVO-M coagulating and precipitating agents had removed the most strongly colored part of the apple juice. The tastes of samples "A-3" and "A-4" after the clarification treatment remained at least as good as that of either the blank sample "A-1" or the PVP-treated sample "A-2."

*Example "B"*

Apple juice, obtained commercially in a fresh and unfermented condition as a "bulk from barrel" product, was subdivided into eight separate one hundred milliliter volume portions. One of the samples was left untreated as a blank for control purposes. To each of the other seven there was added PVO (K-17.5) in individual treating quantities of 0.2; 0.1; 0.05; 0.03; 0.01; 0.007; and 0.003 percent, respectively. All of the treated samples developed a precipitate, quantitatively relatively proportionate to the amount of PVO added. Each of the samples, including the blank, was then filtered, using a minor proportion of a cellulosic type filter aid ("Filter Cel") in the process. All of the samples were obtained in a crystal clear condition after the filtration. However, each of the samples had different degrees of coloration, with those that had been treated with greater quantities of the PVO being less highly colored. These marked and easily discernible differences between the several samples indicated that the polymer had precipitated parts of the colorific bodies from the apple juice. In order to illustrate the effect on a quantitive basis, the percentage of light transmission of each sample as compared to an identically contained volume of distilled water was spectrophotometrically determined using light from a standard tungsten filament bulb source that was passed through a blue light filter effective in the 425 millimicron range. The results are graphically depicted in Figure 1 of the accompanying drawing. The improvement achieved through use of the PVO clarifying agent is obvious upon analysis of the therein contained data, in which greater transmission percentages are proportional to and representative of greater clarity.

Excellent results commensurate with the foregoing are obtained when similar treatment of apple juice is made with PVO-M and its water soluble homologues and isomers or when N-vinyl-2-oxazolidinone polymers of differing K-values are utilized.

*Example "C"*

Following the general procedure of Example "A," four identical samples of each of the following commercially obtained beverages were prepared:

Six percent bottled beer
Semi-sweet dinner wine, vintage 1950
Fresh apple juice ("bulk from barrel")
Concord grape juice (sugar sweetened)
Prune juice (water extract of dried prunes)

The first of each of the samples was left unmodified as a blank. To the second of each of the samples there was added a minor proportion of K-30 PVP. To the third of each of the samples there was added a minor proportion of K-17.5 PVO. The fourth sample of each beverage was treated with a minor proportion of K-17.3 PVO-M. About 0.2 percent quantities of each of the polymeric agents were added to the juice samples while about 0.1 percent quantities were employed for each of the beer and wine samples. Each of the samples was then spectrophotometrically analyzed for its clarity in comparison with distilled water, after being filtered, in the manner set forth in Example "B." The results are set forth in the graphic portrayals in Figure 2 of the accompanying drawing, wherein, as in Figure 1, greater transmission percentages are in indication of greater relative clarity.

Example "D"

To one hundred milliliters of a commercially obtained six percent alcohol content bottled beer there was added five drops of a ten percent aqueous solution of PVO–M (K–17.3). A precipitate formed within a minute. The treated beer was clearer than the untreated beer. In addition, its foam was definitely improved by the treatment, being thicker, creamier and richer looking than foam from untreated beer and having a life about twice as long as foam from the same untreated beverage. The treated beer tasted as least as good as the untreated beer.

Substantially identical results were additionally obtained with both raw and finished beer treated in a commercial brewery with 0.005 percent PVO–M. The PVO-M-treated beverages were rendered chill proof at actual beer temperatures as low as their freezing points and to remain haze free upon being returned to room temperature after the treatment. The same remarkable benefit may be obtained using PVO and other homologous, water-soluble, N-vinyl-2-oxazolidinone polymers as treating agents.

Example "E"

To indicate the probable character or nature of the ingredients that are coagulated and precipitated from beverages by the N-vinyl-2-oxazolidinone polymers, a series of aqueous solutions of various natural products and chemicals was treated with minor proportions of PVO and PVO–M to observe whether or not precipitation would occur. The liquids treated and the results obtained are set forth in the following tabulation, wherein the symbol "X" indicates formation of a precipitate and a blank space indicates no result.

| Aqueous Liquid Treated | Precipitating Agent | |
|---|---|---|
| | PVO | PVO-M |
| Bacteria Suspensions: | | |
| Yeast Suspension | | |
| Staphylococci Suspension | | |
| Cow Stomach Rumen | | |
| Proteins: | | |
| Egg Albumin | | |
| Beef Broth | | |
| Beef Heart Extract | | |
| Agar Agar | X | |
| Peptone | | |
| Amino Acids: | | |
| N-Acetyl Phenyl Glycine | | |
| Hydrolyzed Vegetable Protein | | X |
| Carbohydrates—Gums: | | |
| Soluble Starch | | |
| Xylose | | |
| Xylane | | |
| Sodium Carboxymethylcellulose | | |
| Ghatti Gum | | |
| Beverages: | | |
| Tea | X | X |
| Strawberry Juice | X | X |
| Apple Juice | X | X |
| Wine | X | X |
| Beer | X | X |
| Grape Juice | X | X |
| Chemicals: | | |
| Lactic Acid | | |
| Citric Acid | | |
| Tartaric Acid | | |
| Tannic Acid | X | X |
| Indole-3-Acetic Acid | X | X |
| Indole-3-Propionic Acid | X | X |
| Indole Butyric Acid | X | X |
| n-Caprylic Acid (in 50 percent ethanol) | | |
| Miscellaneous: | | |
| Pectin | X | X |
| Saponin | X | |

From the foregoing it would appear that the haze-inducing ingredients that are precipitated by N-vinyl-2-oxazolidinone polymeric agents are probably more likely to be pectins, tannins or proteinous complexes than unmodified proteins or carbohydrates.

What is claimed is:

1. Process for treating essentially clear beverages to materially clarify them and render them stabilized against hazing which process comprises adding to the beverage being treated a minor proportion of between about 0.0001 and 1 percent by weight, based on the weight of the beverage, of a coagulating and precipitating agent for haze-inducing ingredients in the beverage, which agent consists of an N-vinyl-2-oxazolidinone polymer of the structure:

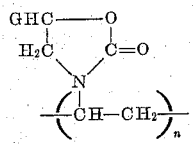

wherein G is selected from the group consisting of hydrogen and methyl, and $n$ is an integer having a positive value of at least about 25; whereupon the haze-inducing ingredients are coagulated and precipitated from said beverage.

2. The process of claim 1, wherein between about 0.001 and 0.2 percent of said N-vinyl-2-oxazolidinone polymer is added to said beverage.

3. The process of claim 1, wherein said N-vinyl-2-oxazolidinone polymer has a Fikentscher K-value between about 10 and 75.

4. The process of claim 1, wherein said treatment is performed at a temperature between the freezing point of the beverage and about 40° C.

5. The process of claim 1, wherein said treatment is performed at about room temperature.

6. The process of claim 1, wherein said N-vinyl-2-oxazolidinone polymer is poly-N-vinyl-2-oxazolidinone.

7. The process of claim 1, wherein said N-vinyl-2-oxazolidinone polymer is poly-N-vinyl-5-methyl-2-oxazolidinone.

8. The process of claim 1, wherein said beverage is beer.

9. The process of claim 1, wherein said beverage is an unfermented fruit juice.

10. The process of claim 1, wherein said beverage is a wine.

11. The process of claim 1, and including the additional subsequent step of permitting said coagulated and precipitated haze-inducing ingredients to settle in said beverage.

12. The process of claim 1, and including the additional subsequent sequential steps of permitting said coagulated and precipitated haze-inducing ingredients to settle in said beverage and then physically separating said settled ingredients from the clarified beverage product.

13. The process of claim 1, and including the additional subsequent step of filtering said treated beverage to remove said coagulated and precipitated haze-inducing ingredients therefrom.

14. Process for treating essentially clear beverages to materially clarify them and render them stabilized against hazing which process comprises adding to the beverage being treated a minor proportion of between about 0.0001 and 1 percent by weight, based on the weight of the beverage, of a water-soluble N-vinyl-2-oxazolidinone polymer as a coagulating and precipitating agent for haze-inducing ingredients in the beverage whereupon the haze-inducing ingredients are coagulated and precipitated from said beverage.

15. Process for treating essentially clear beverages to materially clarify them and render them stabilized against hazing which process comprises adding to the beverage being treated a water-soluble N-vinyl-2-oxazolidinone polymer as a coagulating and precipitating agent for haze-inducing ingredients in the beverage, said agent being added in an amount sufficient to materially coagulate and precipitate said haze-inducing ingredients from said beverage; and removing said precipitate from the beverage.

References Cited in the file of this patent

UNITED STATES PATENTS

| 2,688,550 | McFarlane | Sept. 7, 1954 |
| 2,811,449 | Witwer et al. | Oct. 29, 1957 |